G. L. McCAIN.
GEAR DRIVING MECHANISM.
APPLICATION FILED JUNE 16, 1917.

1,434,620.

Patented Nov. 7, 1922.

INVENTOR:
George L. McCain,
BY Milton Sibbetts
ATTORNEY.

Patented Nov. 7, 1922.

1,434,620

UNITED STATES PATENT OFFICE.

GEORGE L. McCAIN, OF DETROIT, MICHIGAN, ASSIGNOR TO PACKARD MOTOR CAR COMPANY, OF DETROIT, MICHIGAN, A CORPORATION OF MICHIGAN.

GEAR-DRIVING MECHANISM.

Application filed June 16, 1917. Serial No. 175,094.

*To all whom it may concern:*

Be it known that I, GEORGE L. McCAIN, a citizen of the United States, and resident of Detroit, Wayne County, State of Michigan, have invented certain new and useful Improvements in Gear-Driving Mechanism, of which the following is a specification.

This invention relates to driving mechanism and particularly to such mechanism for driving aircraft propellers.

One of the objects of the invention is to provide an approximately balanced driving mechanism for two propellers and particularly coaxially arranged propellers.

Another object of the invention is to provide a simple and novel driving mechanism for concentrically arranged propeller shafts.

Another object of the invention is to provide epicyclic gearing for driving two concentric shafts from one driving shaft.

Other objects of the invention will appear from the following description taken in connection with the drawings which form a part of this specification, and in which:—

Figure 1:
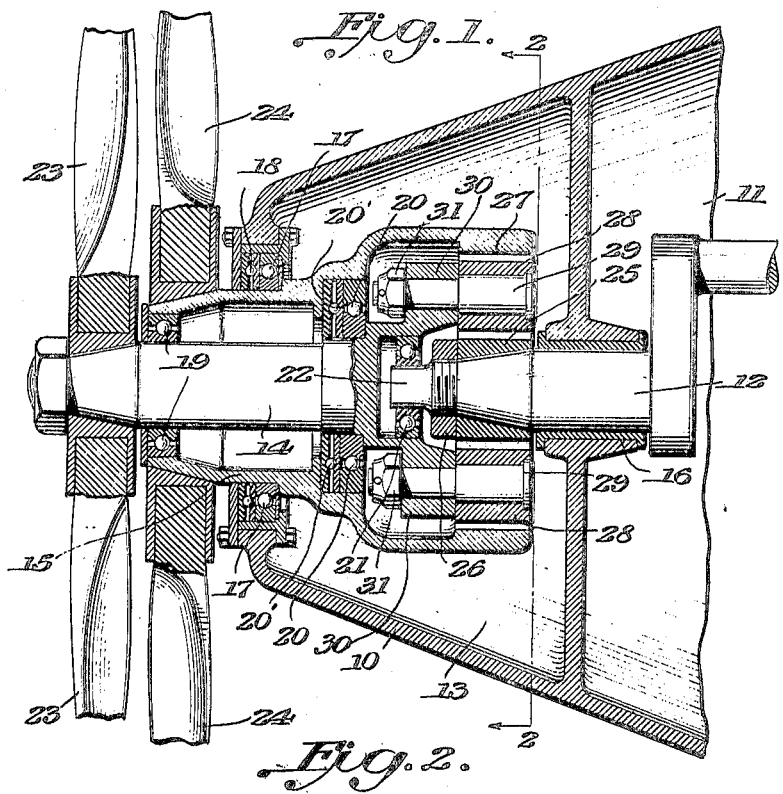
Figure 2:
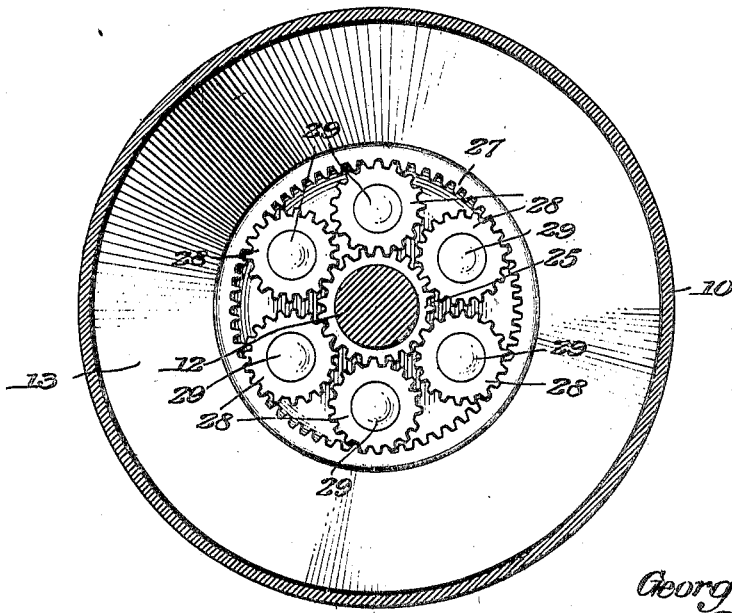

Fig. 1 is a longitudinal sectional view through a driving mechanism involving the invention; and Fig. 2 is a transverse sectional view on the line 2—2 of Fig. 1.

Referring to the drawings, 10 represents a support shown in the form of a casing, the forward compartment 11 of which may comprise a motor crank case or housing for a shaft 12, which is shown as a part of a motor crank shaft. This shaft is the main driving shaft of the driving mechanism comprising this invention.

A compartment 13 formed by the casing 10 houses the gearing between the driving shaft 12 and the driven shafts hereinafter described. This compartment may contain lubricant for the gearing. The two driven shafts just referred to are indicated at 14 and 15 respectively, the shaft 14 telescoping within the shaft 15, and as shown these shafts are concentrically arranged and they are coaxial to the driving shaft 12.

These three shafts 12, 14 and 15 are supported in the casing 10. The shaft 12 is supported in the bearing 16 and there may be another similar bearing for this shaft at its other end, but it is unnecessary to show it in the drawing. The hollow shaft 15 is supported in an annular ball bearing 17 and there is also a thrust bearing 18 for this shaft. The shaft 14 is supported in separated bearings 19 and 20 in the hollow shaft 15 and there is also a thrust bearing 20'. An annular ball bearing 21 is arranged between the shaft 14 and the extended end 22 of the driving shaft 12. It will be seen that these various bearings keep the several shafts in proper alignment.

The end of the driven shaft 14 projects beyond the end of the shaft 15 and there are aircraft propellers 23 and 24 on the respective ends of these shafts. These propellers therefore will revolve coaxially, and they are intended to rotate in opposite directions. The propeller 23 has a lead opposite to that of propeller 24 for the obvious purpose of causing said propellers to pull together. Said propeller 23, that is the forward propeller, is of somewhat lesser pitch than the other propeller, so that the action of both propellers will be substantially the same. In other words, since the forward propeller will by its action increase the speed of the air met by the rear propeller, the pitch of the rear propeller is made greater to thereby approximately equalize the resistances.

The invention further involves a balanced drive from the driving shaft 12 to the two driven shafts 14 and 15. In the form shown herein this drive comprises a spur gear 25 on the shaft 12, secured thereto as by a nut 26, an internal gear 27 on the shaft 15, this internal gear being somewhat larger than and in a plane with the spur gear 25, and one or a series of spur pinions 28 mounted on a pin or pins 29 on the shaft 14 offset from the center of said shaft and in mesh with the spur gear 25 and the internal gear 27. Thus there is an epicyclic train of gearing involved in the geared connection between the driving shaft 12 and the driven shafts 14 and 15 and it will be understood that when the driving shaft 12 is rotated it will cause a rotation of the shaft 14 in one direction and the shaft 15 in the opposite direction, the relative speeds of such shafts depending in part upon the resistance met by the propellers 23 and 24 which are secured to said shafts respectively.

In the illustrated form of the invention there are six of the pinions 28 between the gear 25 and the internal gear 26 and the pins 29 upon which these pinions are mounted are secured to a flanged portion 30 of the shaft 14 as by nuts 31.

But a single form of the invention is shown and described herein. However it will be understood that other forms and modifications may be made without departing from the spirit or scope of the invention.

Having thus described my invention, what I claim and desire to secure by Letters Patent is:

1. In driving mechanism, the combination with a driving shaft and two driven shafts, of a propeller mounted on each of said driven shafts, said propellers being of opposite lead and of relatively different pitch, and gearing between said driving shaft and said driven shafts for producing an approximately balanced drive to said driven shafts and driving said driven shafts and the propellers thereon in opposite directions.

2. In driving mechanism, the combination with a driving shaft and two driven shafts, of a propeller mounted on each of said driven shafts said propellers being of opposite lead and of relatively different pitch, and gearing between said driving shaft and said driven shafts for producing an approximately balanced drive to said driven shafts.

3. The combination with a driving shaft and two propellers of relatively different pitch, of approximately balanced driving means from said shaft to said propellers.

4. The combination with a driving shaft and two propellers of relatively different pitch, of approximately balanced driving means from said shaft to said propellers and arranged to drive the propellers in opposite directions.

5. The combination with a driving shaft and two propellers of relatively different pitch and coaxially arranged, of approximately balanced driving means from said shaft to said propellers.

6. The combination with a driving shaft and two propellers of relatively different pitch and opposite lead, of approximately balanced driving means from said shaft to said propellers.

In testimony whereof I affix my signature.

GEORGE L. McCAIN.